US012485452B2

(12) United States Patent
Nägele et al.

(10) Patent No.: US 12,485,452 B2
(45) Date of Patent: Dec. 2, 2025

(54) SCREENING MACHINE HAVING A SCREEN TRAY

(71) Applicant: Kleemann GmbH, Göppingen (DE)

(72) Inventors: Florian Nägele, Hüttisheim (DE); Emil Scheurer, Wangen (DE)

(73) Assignee: Kleemann GmbH (DE)

( * ) Notice: Subject to any disclaimer, the term of this patent is extended or adjusted under 35 U.S.C. 154(b) by 0 days.

(21) Appl. No.: 18/917,455

(22) Filed: Oct. 16, 2024

(65) Prior Publication Data

US 2025/0153221 A1 May 15, 2025

(30) Foreign Application Priority Data

Nov. 15, 2023 (DE) ..................... 10 2023 131 848.9

(51) Int. Cl.
*B07B 1/46* (2006.01)
*B07B 1/48* (2006.01)

(52) U.S. Cl.
CPC .............. *B07B 1/4609* (2013.01); *B07B 1/48* (2013.01)

(58) Field of Classification Search
CPC ............ B07B 1/46; B07B 1/4609; B07B 1/48
USPC .......................................................... 209/363
See application file for complete search history.

(56) References Cited

U.S. PATENT DOCUMENTS 3,406,823 A * 10/1968 Crain ........................ F16F 1/02 209/403
3,557,953 A 1/1971 Keine
3,608,482 A * 9/1971 Bubley ................... B41F 15/36 101/415.1
4,539,734 A * 9/1985 Messerschmitt ...... F16B 5/0692 160/383
7,578,394 B2 * 8/2009 Wojciechowski .... B07B 1/4645 209/276
8,002,116 B1 * 8/2011 Cato ......................... B07B 1/46 209/318

(Continued)

FOREIGN PATENT DOCUMENTS

CA 3006973 A1 * 12/2018 ............... B07B 1/48
CN 114682487 A * 7/2022 ............... B07B 1/22
DE 2501750 A1 * 1/1975

(Continued)

OTHER PUBLICATIONS

European Search Report for corresponding patent application No. 24205073.0, dated Apr. 1, 2025, 6 pages (not prior art).

(Continued)

*Primary Examiner* — Terrell H Matthews
(74) *Attorney, Agent, or Firm* — Lucian Wayne Beavers; Patterson Intellectual Property Law, PC

(57) ABSTRACT

A screening machine (10) has a screen tray (60), in which at least one screen lining (20) is disposed between two side walls (61) wherein a screen tensioner (40) is assigned to the screen lining (20), which screen tensioner (40) extends, with its longitudinal ends, through a respective feedthrough (62) of the side wall (61). At least one of the feedthroughs (62 is covered, at least in part, on its outer face facing away from the screen lining (20) by a removable cover (70), wherein the cover (70) is supported on the outer face of the side wall (61) by a sealing surface (72) of a sealing element (74), the sealing surface (72) facing the side wall (61), such that dust is prevented from escaping and the operating safety and occupational safety is improved.

14 Claims, 4 Drawing Sheets

(56) References Cited

U.S. PATENT DOCUMENTS

| | | | | |
|---|---|---|---|---|
| 2001/0052484 | A1* | 12/2001 | Fallon | B07B 1/46 209/311 |
| 2007/0108106 | A1* | 5/2007 | Burnett | B07B 13/16 209/325 |

FOREIGN PATENT DOCUMENTS

| | | | | | |
|---|---|---|---|---|---|
| DE | 102013101039 | A1 | | 8/2014 | |
| DE | 102023121746 | B3 | * | 10/2024 | B07B 1/48 |
| DE | 102023131848 | B3 | * | 12/2024 | B07B 1/48 |
| EP | 0238455 | A2 | * | 9/1987 | B07B 1/48 |
| EP | 0641608 | A2 | * | 3/1995 | B07B 1/4645 |
| NO | 329948 | B1 | * | 1/2011 | B07B 1/46 |
| WO | 02085546 | A1 | | 10/2002 | |
| WO | WO-2005068092 | A1 | * | 7/2005 | B07B 1/48 |
| WO | 2006096999 | A1 | | 9/2006 | |

OTHER PUBLICATIONS

German Office Action for corresponding patent application No. 10 2023 131 848.9, dated Jun. 21, 2024, 6 pages (not prior art).

Co-pending U.S. Appl. No. 18/743,221, filed Jun. 14, 2024 (not prior art).

* cited by examiner

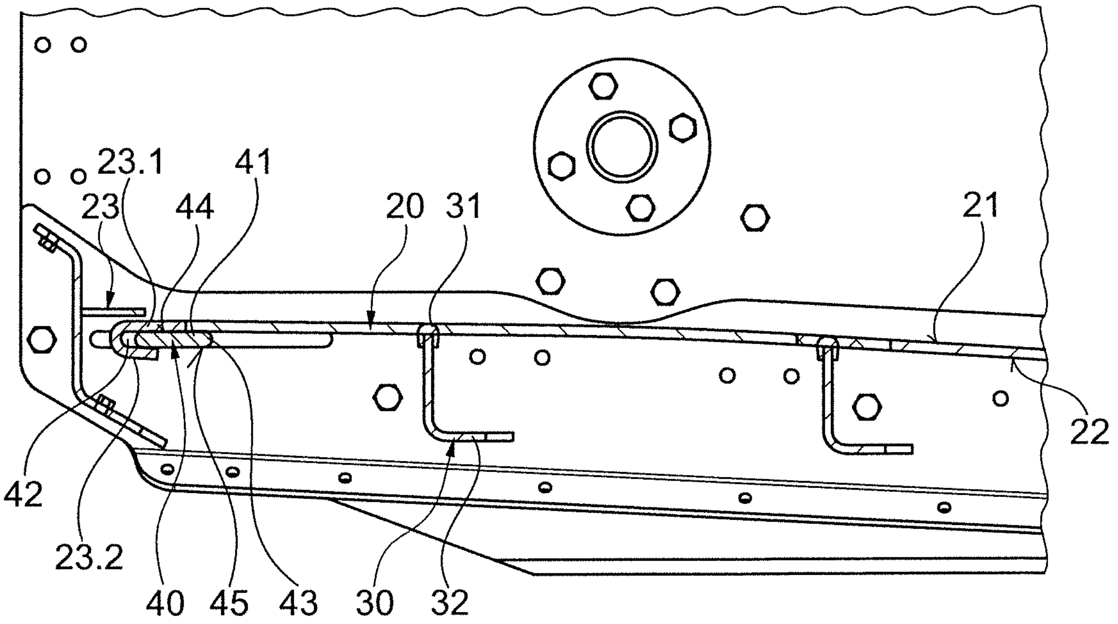
Fig. 6
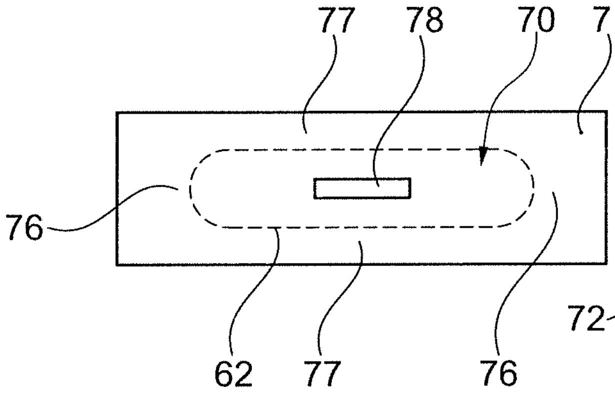
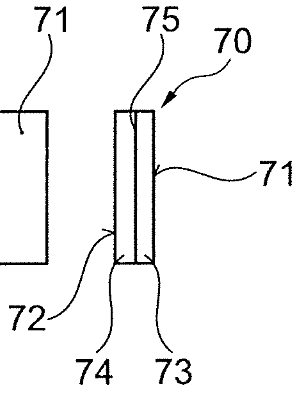
Fig. 7 Fig. 8

SCREENING MACHINE HAVING A SCREEN TRAY

RELATED APPLICATIONS

The present application claims priority to German Patent Application Ser. No. DE 10 2023 131 848.9 filed Nov. 15, 2023, which is incorporated herein by reference.

BACKGROUND OF THE DISCLOSURE

Field of the Disclosure

The disclosure relates to a screening machine having a screen tray, in which at least one screen lining is disposed between two side walls, wherein the screen lining is assigned to a screen tensioner, the longitudinal ends of which are guided through one feedthrough each of the side wall.

Description of the Prior Art

DE 25 01 750 A discloses a screening machine crusher having a screen tray. Three screen linings are superposed inside the screen tray. These screen linings are designed as wire racks that have a folded edge at their longitudinal ends. The folded edges are bent in the direction from the top of the screen lining to the bottom. The folded edges have a V-shaped cross-section. Screen tensioners, which are designed in the form of bars, engage with these folded edges. The screen tensioner has a tensioning projection forming a tensioning edge at one tensioning end. This tensioning edge rests against the base of the folded edge. At the longitudinal ends, the screen tensioners have fastening sections on which the tensioning elements act to tension the screen lining in the screen tray. The fastening sections are guided out of the screen tray through elongated feedthroughs in the side walls and can be tensioned outside the screen tray using suitable tensioning devices.

EP 0 238 455 A2 discloses a screening machine, in which a screen tensioner in the form of a hollow section is used to pretension a screen lining. The screen tensioner has a molded tensioning projection that forms a tensioning edge.

SUMMARY OF THE DISCLOSURE

The disclosure addresses the problem of improving the operational safety of the screening machine described above.

This problem is solved in that at least one of the feedthroughs of the side walls is covered, at least sectionally, by a removable cover on its outer face facing away from the screen lining, wherein a sealing surface of a sealing element facing the side wall of the cover rests on the outer face of the side wall.

During operation of the screening machine, dust can reach the environment through the side-wall feedthroughs. Depending on the composition of the material to be crushed, the dust can result in incrustations and deposits in the area of the tensioning device of the screen tensioner, restricting the accessibility and functionality of the screen tensioner. In addition, the dust also puts a strain on other machine components and people working in the vicinity of the screening machine. To prevent dust from escaping, in accordance with the disclosure a cover is proposed, which closes the feedthrough of the side wall when the screen tensioner is properly installed. The cover is easy to fit as it is positioned on the outer face of the side wall, where its sealing surface rests on the side wall. This renders installation easy and ensures reliable operational safety.

According to a preferred variant of the disclosure, provision may be made for the sealing element to be made of a magnetic material or to have at least one magnetic element. The magnetic material or at least one magnetic element can be used to create a magnetic connection between the cover and the side wall. In this way, the cover is securely attached to the side wall. This type of connection also has the advantage that the screen tensioner can be displaced in relation to the side wall when tensioning. The displacement motion of the screen tensioner can also be used to move the cover bring it into its appropriate position. This is rendered possible by the magnetic connection.

Particularly preferably, provision may be made for the sealing element to have a flat, in particular strip-shaped, cut made of magnetic material. Then, the cover can be installed in a space-saving manner having a low overall height. At the same time, the mechanical assignment of the cover to the side wall is guaranteed regardless of its exact position assignment to the side wall. This is advantageous, as the position assignment can change during the tensioning of the screen lining due to material elongation of the screen lining or due to dimensional tolerances of different screen linings.

Advantageously, longitudinal overlapping sections and/or transverse overlapping sections of the flat cut of the sealing element extend laterally next to the assigned feedthrough to establish a magnetic connection with the side wall there. The longitudinal overlapping sections extend in the direction of the longitudinal extent of the slot-like feedthrough. The transverse overlapping sections extend transversely to the direction of the longitudinal extent of the slot-like feedthrough.

According to a possible variant of the disclosure, provision may be made for a cover section to be directly or indirectly connected to the sealing element. Advantageously, provision may be made for the cover section to have a flat, in particular strip-shaped, cut, preferably consisting of soft-elastic material, in particular a rubber or rubber-like material. The sealing element, for instance consisting of a flexible material, can be mechanically supported by means of such a flat cut, i.e., the overall manageability of the cover is improved. Advantageously, the sealing element is designed in such a way that it provides a plane seal around the feedthrough such that an ideal sealing effect is achieved, even if there are certain surface irregularities. The cover then adapts to the existing conditions on the side wall, in particular in combination with a cover section in the form of a flat cut. Preferably, the sealing element completely encompasses the feedthrough.

The cover can be manufactured easily if provision is made for the sealing element to be bonded, preferably glued, to the cover section. In this way, a compact design can also be implemented.

A possible variant of the disclosure can be characterized in that the cover has an aperture, which is at least sectionally aligned with the feedthrough of the side wall and through which aperture the screen tensioner is guided, and in that the sealing element encompasses the aperture on the latter's side facing the side wall.

A further variant of the disclosure can be such that the cover has an aperture, which is at least sectionally aligned with the feedthrough of the side wall and through which aperture the screen tensioner is guided, and that the sealing element surrounds the aperture on the latter's side facing the side wall circumferentially, preferably encompasses it completely. This results in a simple installation. Once the screen tensioner has been connected to the screen lining, the apertures of the covers can be slipped onto the fastening sections of the screen tensioner. They are then already essentially aligned and positioned in the correct position. The covers are then pushed against the assigned side wall and attached thereto, wherein the seal is also created. In this context, it is advantageous if the fastening section of the screen tensioner has a non-circular, preferably rectangular, cross-section.

A preferred variant of the disclosure can be such that the screen tensioner has a bar-like or section-like tensioning section, which has one fastening section each in the area of each of its two longitudinal ends, that the tensioning section has a first tensioning projection in the area of a first tensioning side, which tensioning projection forms a first tensioning edge, and has a second tensioning projection on an opposite second tensioning side, which tensioning projection forms a second tensioning edge, that the first tensioning edge and the second tensioning edge extend between the two fastening sections, that the first tensioning edge forms a first tensioning contour and the second tensioning edge forms a second tensioning contour and that preferably the first and the second tensioning contours have different geometries. The tensioning edges can have the same or different geometries.

As the screen tensioner has two tensioning edges, it can bring either one or the other tensioning edge into tensioning engagement with the screen lining to be fitted. If the tensioning edges are geometrically different and thus designed for an individual screen lining, the user can use one screen tensioner to tension two different screen surfaces in one screening device without having to change the screen tensioner. The same screen tensioner, which can preferably be used in two different mounting positions in an inverted manner. This greatly facilitates the maintenance of the screening machine. In these different installation situations, the same cover can be used to cover the feedthrough in the side wall.

One of the two tensioning edges may be convex having a curvature extending between the two fastening sections and the other tensioning edge may be convex or concave having a curvature extending between the two fastening sections, or the other tensioning edge may extend in a straight line between the two fastening sections. If one tensioning edge is convex and the other tensioning edge is concave, then it is advantageous if the contours that the two tensioning edges follow differ from each other, wherein preferably the amount of camber is different at both ends.

The curvature of the convex tensioning edge of the one tensioning projection can be designed for a matching screen lining to tension it in the screen tray at the most uniform tension possible. When tensioning the screen lining, the tensioning edge having the most protruding area first comes into contact with the assigned fastening edge of the screen lining and tensions the latter there. As the screen tensioner is tensioned further, it deforms elastically, wherein the remaining areas of the tensioning edge gradually come into contact with the screen lining and tensioning it. As a result, uniform tension is achieved across the entire width of the screen lining. This takes account of the fact that evenly tensioned screen linings have a longer service life and that the inherent properties of the screen lining, such as self-cleaning, are supported.

If the second tensioning edge is also convex, the degree of curvature can be designed for the corresponding screen lining to ensure that it is pre-tensioned evenly.

If the second tensioning edge is concave, this type of screen tensioner is suitable for screen linings that require greater tension on two ends of the lining. Accordingly, these first come into contact with the concave geometry of the screen tensioner.

If the second tensioning edge is straight, the screen tensioner can be used on the straight edge for screen linings that only require little screen tension. The second tensioning edge is therefore intended for light, delicate screen linings, for instance. These require less preload. Due to the lower pre-tensioning force, a strongly curved tensioning edge is not elastically deformed to the same extent, such that the outer areas of the light screen lining do not make contact with the tensioning edge and remain untensioned.

If, according to a variant of the disclosure, provision is made for the two longitudinal ends of the screen tensioner to each have a fastening section, for a tensioning piece of a tensioning device to act on the fastening section to tension the screen lining in the tensioning direction, and for the cover to be disposed in the area between the tensioning piece and the side wall of the screen tray, then the cover is securely installed behind the tensioning piece protected against mechanical effects. In addition, the tensioning piece can then also provide a certain degree of positional stability for the cover.

The tensioning device has a simple design if provision is made for two spaced-apart legs to be connected to the tensioning piece, and for the two legs and the tensioning piece to delimit a mount, in which the fastening section of the screen tensioner is accommodated.

A protected accommodation of the cover can also be achieved if provision is made for the legs to each be equipped with a threaded mount, wherein the central longitudinal axes of the threaded mounts extend in tensioning direction, for a support bearing having a holder to be attached to the side wall, for the holder to have screw mounts, through which the tensioning bolts are passed and bolted into the threaded mounts of the legs, for two bearing pieces to be connected to the holder, which bearing pieces are attached to the side wall and are disposed spaced apart, and for the holder and the support bearings to at least sectionally delimit a section of the side wall within which the cover is disposed.

BRIEF DESCRIPTION OF THE DRAWINGS

The disclosure is explained in greater detail below based on exemplary embodiments shown in the drawings. In the figures, FIG. 6 shows a further embodiment of the disclosure, in which a schematic sectional view through a screen lining of a screen tray of the screening machine of FIG. 1 is shown and FIG. 7 shows a schematic side view of a sealing arrangement for the screening machine of FIGS. 1 to 6 and FIG. 8 shows a front view of the sealing arrangement of FIG. 7.

FIG. 1 shows a screening machine 10 according to the disclosure. This screening machine 10 is designed as a mobile screening machine 10. It is also conceivable that the disclosure could be used in a stationary screening machine. It is also conceivable that the machine could be used in a combined crushing and screening plant.

DETAILED DESCRIPTION

Figure 1:
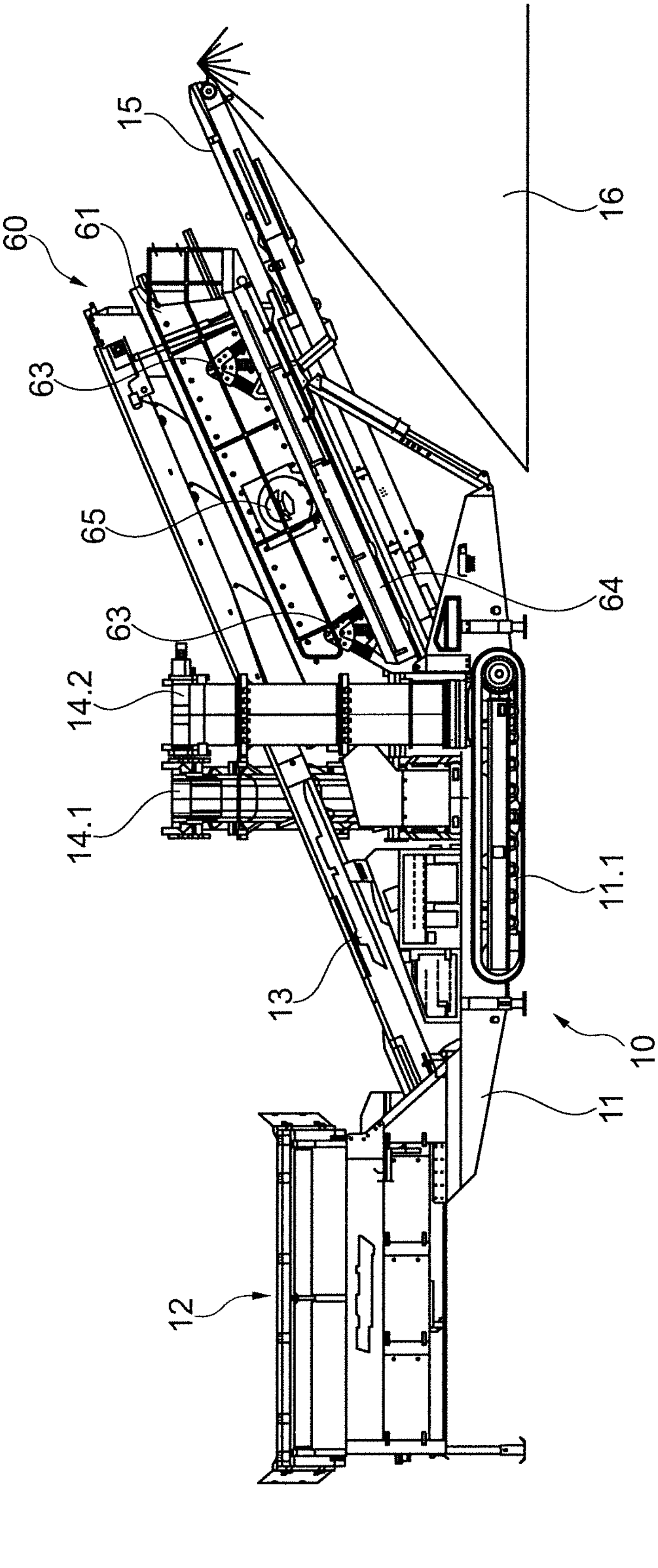
FIG. 1 shows a side view of a screening machine.

The screening machine 10 has a chassis 11, which is supported by undercarriages 11.1 to be able to move the screening machine 10. Preferably, the screening machine 10 has a feed hopper 12. A wheel loader can be used to fill material to be screened into the feed hopper 12.

The feed hopper 12 has a transport device, for instance a vibrating chute, a conveyor belt, a feed belt or a bunker discharging conveyor, by means of which the fed material can be conveyed to an infeed belt 13. The infeed belt 13 can be designed as an endless circulating conveyor belt. The infeed belt 13 conveys the material to be screened to a screen device, which has a screen tray 60.

Figure 2:
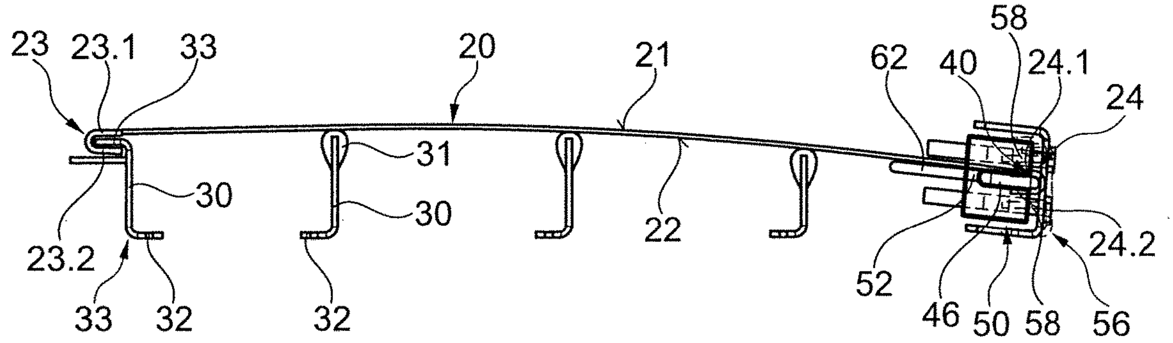
FIG. 2 shows a schematic diagram of a screen deck of the screening machine of FIG. 1.

The screen device is used to screen out at least two fractions from the material fed in. For this purpose, the screen device has at least one screen lining 20, as shown in FIG. 2.

FIG. 1 further illustrates that the screen tray 60 has side walls 61 which extend in the longitudinal direction of the screen.

The screen tray 60 is mounted on a stationary screen tray support 64 by means of spring elements 63. A drive 65 can be used to oscillate the screen tray 60 to screen the material.

At least one discharge belt 14.1, 14.2 or at least one fine grain or stockpile belt 15 is assigned to the screen device. In this exemplary embodiment, two discharge belts 14.1, 14.2 and a fine-grain or stockpile belt 15 are used. Accordingly, two screen linings 20 are installed in the screen device.

The material to be screened is fed onto the upper screen lining 20. The material that falls through the upper screen lining 20 reaches the screen lining 20 below. Material that does not fall through the upper screen lining 20 reaches one of the two discharge belts 14.1, 14.2. The material that does not fall through the second screen lining 20 reaches the second discharge belt 14.1, 14.2. The material, which falls through both screen linings 20 in the form of fine-grain material, reaches the fine-grain or stockpile belt 15. The two discharge belts 14.1, 14.2 and the fine grain or stockpile belt 15 convey the grain fractions fed thereto onto stockpiles 16.

FIG. 2 shows a schematic representation of a screen device. As the illustration shows, support elements 30 are installed in the screen tray 60 to support the screen lining 20. The support elements 30 have a mounting foot 32 with which they are stationarily mounted in the screen tray 60. Opposite from the mounting foot 32, damping elements 31 are mounted on one end of the support elements 30 in a replaceable manner. The damping elements 31 support the screen lining 20 in the area of the bottom of the screen 22.

The support elements 30 can be disposed and aligned with their damping elements 31 in such a way that the screen lining 20 resting on the damping elements 31 forms a curved contour in the longitudinal direction of the screen, as FIG. 2 shows.

The support element 30 on the left-hand side in FIG. 2 has a holder neck 33 at its end facing away from the mounting foot 32. The screen lining 20 is held replaceably on the holder neck 33 by a fastening edge 23.

The screen lining 20 is designed as a flat element and has a screen top 21 opposite from the screen bottom 22. The fastening edge 23 may be bent away from an end section 23.1 of the screen lining 20 to form a bend 23.2. The holding lug 33 engages with this bend 23.2.

At the end facing away from the fastening edge 23, the screen lining 20 has a further fastening edge 24, which is essentially of the same design as the fastening edge 23. Accordingly, a bend 24.2 is bent away from the screen lining 20 at the opposite end section 24.1.

Figure 3:
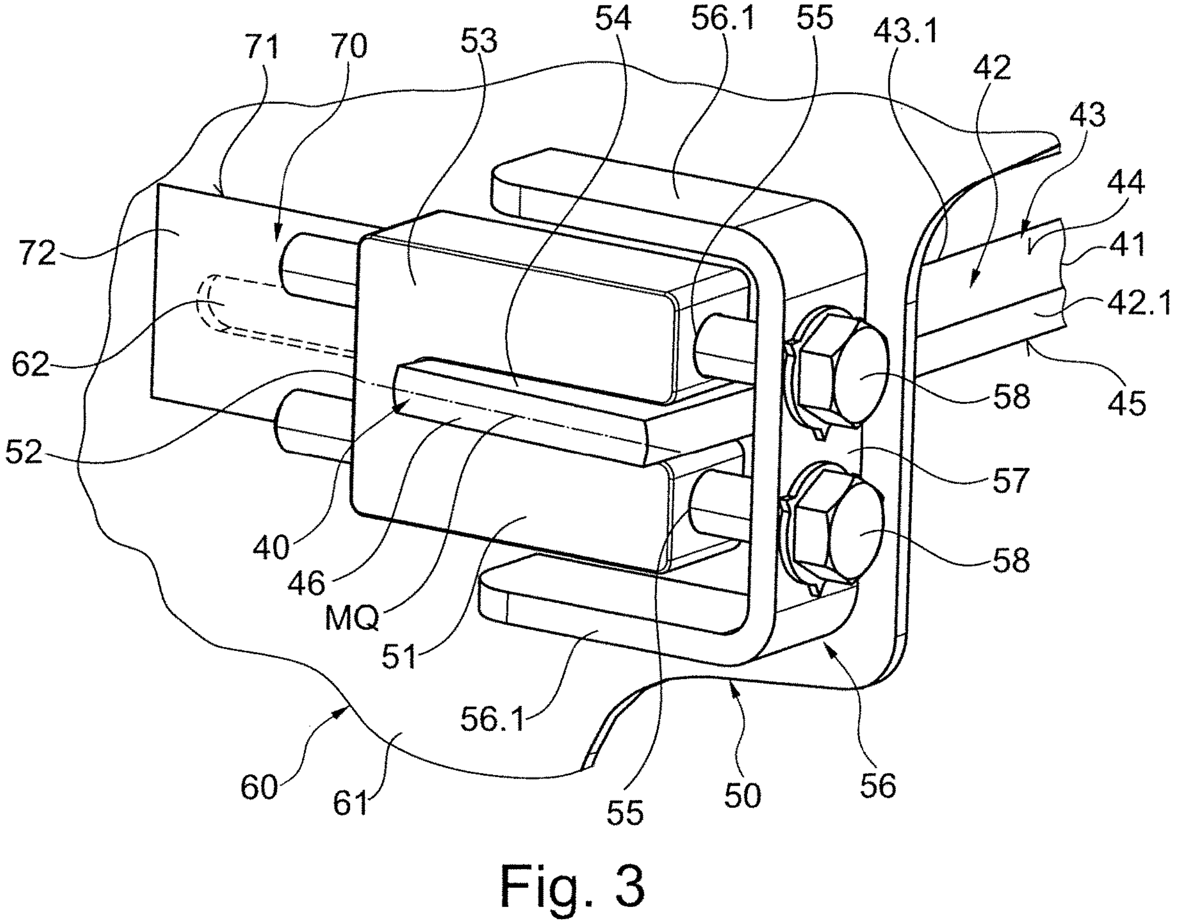
FIG. 3 shows a partial perspective view of a tensioning device for a screen lining of the screening machine of FIG. 1.
Figure 5:
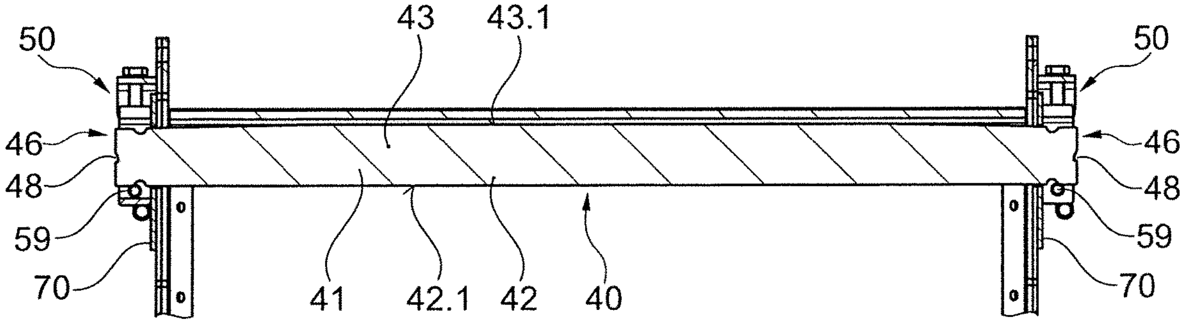
FIG. 5 shows an extended view of the representation of FIG. 4.

The screen lining 20 has to be tensioned in the screen tray 60 in the longitudinal direction (i.e. from left to right in FIG. 2). A screen tensioner 40 is used for this purpose. FIGS. 3 and 5 illustrate that the screen tensioner 40 is essentially rectangular in cross-section. The screen tensioner 40 can therefore have a bar-shaped geometry.

The screen tensioner 40 has a central tensioning section 41, which extends between two end fastening sections 46.

The tensioning section 41 has tensioning projections 42, 43 on its opposite longitudinal sides. The first tensioning projection 42 has a first tensioning edge 42.1. The second tensioning projection 43 has a second tensioning edge 43.1.

Figure 4:
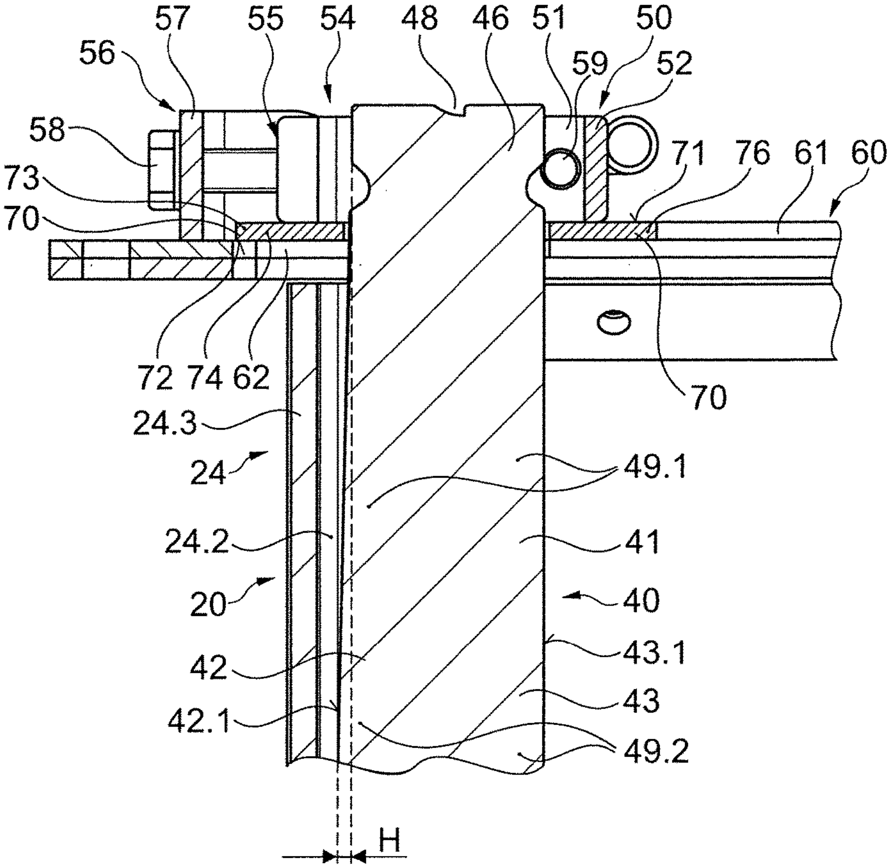
FIG. 4 shows a top view and partial view of a screen tensioner for the screening machine of FIG. 1 in relation to a screen lining and as a horizontal section.

The first tensioning edge 42.1 extends convexly curved between the two fastening sections 46, as illustrated for instance in FIG. 4. FIG. 4 shows a horizontal section through the central transverse plane MQ of the screen tensioner 40. The central transverse plane MQ and thus the sectional plane according to FIG. 4 is shown in FIG. 3.

FIG. 4 shows that the first tensioning edge 42.1 forms a tensioning contour. This tensioning contour has contour end sections 49.1 at its longitudinal ends and a contour center 49.2 in the middle between the contour end sections 49.1. In the tensioning direction, which extends from right to left in FIG. 4, the projection of the first tensioning edge 42.1 into the central transverse plane MQ has a maximum camber H in the area of the contour center 49.2. This maximum camber H results from the fact that the contour center 49.2 is offset in the tensioning direction compared to the contour end sections 49.1 due to the convex curvature. Preferably, the camber H is less than 25 mm.

The second tensioning edge 43.1, which is opposite from the first tensioning edge 42.1, also forms a tensioning contour. This tensioning contour again forms contour end sections 49.1 at opposite ends, which face the fastening sections 46. A contour center 49.2 is formed in the middle between the contour end sections 49.1. In this exemplary embodiment, the projection of the second tensioning edge 43.1 in the central transverse plane MQ extends in a straight line between the two fastening sections 46, as FIG. 4 shows. However, it is also conceivable that the second tensioning edge 43.1 is convexly curved and has a maximum camber, which preferably differs from the maximum camber H of the first tensioning edge 42.1.

It is also conceivable that the second clamping edge 43.1 forms a concave contour. In this case, there is a negative camber H in the center of the contour 49.2. It is preferable that the amount of the two cambers H of the two tensioning edges 42.1, 43.1 deviate from each other.

In other words, different tensioning contours are implemented on the screen tensioner 40 at the two tensioning edges 42.1, 43.1.

As the illustrations further show, it is preferable that the screen tensioner 40 is constructed symmetrically to the central transverse plane MQ.

In the exemplary embodiment shown, the screen tensioner 40 engages with its first tensioning projection 42 in the right-hand bend 24.2 shown in FIG. 2. The first tensioning edge 42.1 of the screen tensioner 40 is in contact with the base section 42.3 below the bottom of the screen 22, which base section results from the bend 24.2. The tensioning projection 42 is thus at least partially enclosed between the bottom of the screen 22 and the bend 24.2.

The fastening sections 46 of the screen tensioner 40 penetrate feedthroughs 62 in the assigned side walls 61 of the screen tray 60 on opposite ends, as FIG. 3 clearly shows. Accordingly, the fastening sections 46 protrude on the outside beyond the side walls 61 of the screen tray 60. Tensioning devices 50, which can be used to adjust the screen tensioner 40 in the tensioning direction along the central transverse plane MQ are disposed in the area of the feedthroughs 62 of the screen tray 60.

The tensioning devices 50 each have a stationary support bearing 56, which is preferably firmly connected, for instance welded, to the side wall 61.

The support bearing 56 can be designed such that it has a holder 57 to which at least one bearing piece 56.1 is connected, preferably integrally formed. By means of the two bearing pieces 56.1 and the holder 57, the support bearing 56 can be firmly connected to the assigned side wall 61. The tensioning device 50 also has a tensioning piece 52, which engages behind the screen tensioner 40 in a form-fitting manner to move it in the tensioning direction. Legs 51, 53 may be connected, preferably molded, to the tensioning piece 52 on opposite ends.

Between the legs 51, 53 there is a mount 54 for the screen tensioner 40. The leg 53 overlaps the top and the leg 51 overlaps the bottom of the screen tensioner 40 such that the screen tensioner 40 is prevented from moving in these directions when it is tensioned. The mount 54 may also be referred to as a mounting space 54 defined between the legs 51 and 53.

At least one tensioning bolt 58 is used to adjust the tensioning piece 52 in the tensioning direction, by means of which tensioning bolt the tensioning piece 52 can be continuously adjusted. In so doing, the tensioning bolt 58 rests against the holder 57. The tensioning piece 52 can be continuously adjusted via a threaded connection.

In this exemplary embodiment, each of the legs 51, 53 has a threaded mount 55. The holder 57 has two feedthroughs through which the tensioning bolts 58 are inserted and screwed into the threaded mounts 55.

FIGS. 4 and 5 show an assembly position in which the screen tensioner 40 is in an untensioned position. If the tensioning bolts 58 of the two tensioning devices 50 are now tightened, the two fastening sections 46 of the screen tensioner 40 are moved in the feedthroughs. In so doing, the maximum camber H of the first tensioning edge 42.1 meets the bottom section 24.3 (see FIG. 4) of the bend 42.1 in the area of the contour center 49.2 of the first tensioning edge. If the tensioning bolts 58 are now tightened further, the screen lining 20 is tensioned starting from the contour center 49.2. This results in a counterforce of the screen lining 20, which acts on the screen tensioner 40. Owing to this counterforce, the screen tensioner 40 is bent such that the first clamping edge 42.1 continuously moves towards the two contour end sections 49.1 on the base section 24.3. In this way, the tensioning force is gradually applied to the screen lining 20. The convexly curved contour of the first tensioning edge 42.1 thus ensures uniform tensioning of the screen lining 20.

When tensioning the tensioning devices 50, the tensioning piece 52 is moved in the tensioning direction. This ensures that the fastening section 46 in FIG. 3 is offset from left to right along the slot-shaped feedthrough 62.

Once a sufficiently uniform tension has been generated in the screen lining 20, the assembly process is complete. The uniform tension can be estimated by a sound test at individual points on the screen lining 20. For this purpose, the screen lining 20 is struck at various points. The tensioning state can be deduced from the sound produced.

The screen lining 20 is removed in reverse order. To this end, first loosen the tensioning bolt 58, then the screen tensioner 40 can be moved in the feedthroughs 62 until it is no longer engaged with the bend 24.2. The screen lining 20 can then be lifted upwards and moved in the opposite direction to the tensioning direction such that the bend 23.2 is no longer engaged with the holding lug 33 (see FIG. 2). The screen lining 20 can then be lifted out of the screen tray 60 and replaced with a new screen lining 20.

If the second screen lining 20 is not identical to the first screen lining 20 and requires a different, in particular less preload than the previously installed screen lining 20, the screen tensioner 40 can be used adapted to this second screen lining 20, for which it only has to be rotated such that the second tensioning edge 42.1 comes into engagement with the assigned bend 24.2 of this screen lining 20. The screen tensioner 40 can then be clamped to the new screen lining 20 again in the same way as explained above.

In other words, the screen tensioner 40 can be used to optimally tension two different screen linings 20.

In order to facilitate for a user to correctly assign the desired tensioning edge 42.1, 43.1 to the individual screen lining 20, an identification marking 48 can be provided in the area of at least one fastening section 46. The identification marking 48 is shown in FIG. 4 by way of example. Preferably, the identification marking 48 is incorporated into the longitudinal end of the fastening section 48.

FIG. 3 illustrates that the feedthroughs 62 in the side walls 61 of the screen tray 60 are each closed by a cover 70. This prevents dust from escaping from the screen tray 60 through the feedthroughs 62 into the environment.

The structure of the covers 70 is shown in FIGS. 7 and 8. There, a front view and a side view of the cover 70 is shown. The cover 70 has an outer cover section 73, which preferably forms the outer face 71 of the cover 40.

A sealing element 74 is directly or indirectly connected to the cover section 73 on the inner face facing away from the outer face 71, which faces the side wall 61. In this exemplary embodiment, the sealing element 74 is directly connected to the cover section 73, for instance glued. Cover section 73 may also be referred to as an outer cover section 73.

The sealing element 74 can be formed by a continuous layered element, preferably consisting of a magnetic material or comprising a magnetic, in particular plane material. For instance, the sealing element 74 can be formed by a sandwich element. However, it is also conceivable that the sealing element 74 is not formed by a surface element, but sectionally has surface areas.

The sealing element 74 is connected to the cover section 73 via a connecting layer 75. Preferably, a cohesive bond is provided between these two components.

The cover section 73 can preferably be formed by a plane, in particular strip-shaped cut in the form of a soft-elastic material. It is also conceivable that the cover section 73 is formed by a strip of material.

As shown in FIG. 7, the sealing element 74 forms an inner sealing surface 72, which is placed on the outer face of the side wall 61 of the screen tray 60 and which covers the area around the feedthrough 62 at least sectionally.

Preferably, the cover 70 forms a longitudinal overlap area 76, which protrudes beyond the longitudinal end of the feedthrough 62 in the assembled state. The arrangement of the feedthrough 62 in relation to the cover 70 is symbolized by a dashed line in FIG. 7 by way of example. Thus, the longitudinal overlapping sections 76 cover the areas adjoining the feedthrough 62 on the longitudinal end.

Furthermore, additionally or alternatively, provision may be made for the cover 70 to have transverse overlapping sections 77, which are spaced apart. As FIG. 7 shows, the transverse overlapping sections 77 are used to cover and seal the areas that laterally adjoin the longitudinal sides of the feedthrough 62.

The cover 70 preferably has a feedthrough 78. The position and size of the feedthrough 78 is such that the screen tensioner 40 and its assigned fastening section 46 can be pushed through the cover 70 at the end or the cover 70 can be fitted onto the fastening section 46. The clear cross-sectional area of the feedthrough 78 is preferably dimensioned such that it is the same size as the outer dimensions of the fastening section 46 or slightly larger than the outer dimensions of the fastening section 46, to achieve the best possible seal. The feedthrough 78 may also be referred to as an aperture 78.

The assignment of the cover 70 to the side wall 61 of the screen tray 60 is shown in FIG. 3. As this representation illustrates, the feedthrough 78 of the cover 70 can be slid over the fastening section 46 of the screen tensioner 40. The sealing surface 72 of the sealing element 74 then comes into contact with the outer face of the side wall 62. The cover 70 is held on the side wall 61, which is made of ferromagnetic material, by means of the magnetic element(s) of the sealing section 74.

In the assembled state, the sealing element 74 can thus come into contact, preferably directly (or also indirectly), with the side wall 62. The cover section 73 faces the tensioning piece 52. The cover section 73 can preferably be used as a carrier material for the sealing element 74.

Preferably, according to the disclosure, provision may be made for the sealing element 74 to have a thickness in the range of 0.5-5 mm, i.e., it is very thin. The assigned cover layer then prevents premature component failure. The greater thickness also makes handling easier, as the cover 70 is easier to grip and remove.

Advantageously, a cover 70 according to the disclosure has a sandwich structure, wherein one side is more magnetic than the other. This ensures that the cover 70 adheres to the side wall 62 and not to any opposite material, such as the tensioning piece 52.

After the cover 70 has been mounted as described above, the tensioning piece 52 can be assigned to the screen tensioner 40 as described above. The screen tensioner 40 can then be tensioned. The fastening section 46 carries the cover 70 along in the tensioning direction, as the fastening section 46 rests against the inner contour forming the feedthrough 78 on the circumference. This displacement of the cover 70 is not prevented by the magnetic connection, i.e., the cover 70 is always optimally assigned to the side wall 61 and the fastening section 46 and the feedthrough 62 is sealed in the best possible way.

The invention claimed is:

1. A screening machine, comprising:

a screen tray including first and second side walls having first and second feedthroughs, respectively, defined therein;

at least one screen lining disposed between the first and second side walls;

a screen tensioner operably associated with the screen lining, the screen tensioner including first and second longitudinal ends each extending through the first and second feedthroughs, respectively; and a first removable cover at least in part covering the first feedthrough, the first removable cover including a sealing element including a sealing surface facing the first side wall and engaging an outer face of the first side wall.

2. The screening machine of claim 1, wherein the sealing element is magnetic.

3. The screening machine of claim 2, wherein the sealing element is formed as a flat strip-shaped piece of magnetic material.

4. The screening machine of claim 3, wherein the sealing element is dimensioned so that when the sealing element covers the first feedthrough the sealing element includes longitudinal overlapping sections and/or transverse overlapping sections extending laterally past the first feedthrough and magnetically connected with the first side wall.

5. The screening machine of claim 2, wherein the first removable cover further includes an outer cover section connected to the sealing element.

6. The screening machine of claim 5, wherein the outer cover section is formed as a flat strip-shaped piece of elastomeric material.

7. The screening machine of claim 6, wherein the sealing element is bonded to the outer cover section.

8. The screening machine of claim 6, wherein the sealing element is glued to the outer cover section.

9. The screening machine of claim 1, wherein:

the first removable cover includes an aperture which is at least partially aligned with the first feedthrough of the first side wall; and the first longitudinal end of the screen tensioner is received through the aperture and the sealing element surrounds the aperture on a side of the aperture facing the first side wall.

10. The screening machine of claim 1, wherein:

the screen tensioner includes a tensioning bar including a central tensioning section located between two fastening sections, the fastening sections being formed on two longitudinal end portions of the tensioning bar, the tensioning bar including first and second oppositely facing tensioning edges defined on the tensioning section, the first tensioning edge forming a first tensioning contour and the second tensioning edge forming a second tensioning contour, the first and second tensioning contours having different geometries from each other.

11. The screening machine of claim 1, wherein:

the screen tensioner includes a tensioning bar including a central tensioning section located between first and second fastening sections, the fastening sections being formed on two longitudinal end portions of the tensioning bar;

the screen tensioner further includes first and second tensioning pieces configured to act on the first and second fastening sections, respectively, to tension the screen lining in a tensioning direction; and the first removable cover is disposed between the first tensioning piece and the outer face of the first side wall of the screen tray.

12. The screening machine of claim 11, wherein:

the first tensioning piece includes first and second spaced apart legs defining a mounting space between the first and second spaced apart legs, the first fastening section being received in the mounting space.

13. The screening machine of claim 12, wherein:

the first and second spaced apart legs of the first tensioning piece each include a threaded mounting hole having a central longitudinal axis extending in the tensioning direction; and the screen tensioner further includes:

a support bearing including a holder and first and second bearing pieces connected to the holder, the first and second bearing pieces being attached to the first side wall, the first and second bearing pieces being spaced apart, the holder and the first and second bearing pieces at least partially delimiting a section of the first side wall on which the cover is disposed, the holder including first and second screw mounts; and first and second tensioning bolts extending through the first and second screw mounts and engaging the threaded mounting holes of the first and second spaced apart legs.

14. The screening machine of claim 1, further comprising:

a second removable cover at least in part covering the second feedthrough, the second removable cover including a second sealing element including a second sealing surface facing the second side wall and engaging an outer face of the second side wall.

* * * * *